United States Patent [19]

Zeibig et al.

[11] Patent Number: 4,668,176
[45] Date of Patent: May 26, 1987

[54] EXTRUSION DEVICE FOR THE PRODUCTION OF HONEYCOMB STRUCTURES

[75] Inventors: Anton Zeibig, Ottensoos; Hans Brigasky; Willi Lewand, both of Lauf, all of Fed. Rep. of Germany

[73] Assignee: Hoechst Ceramtec Aktiengesellschaft, Selb, Fed. Rep. of Germany

[21] Appl. No.: 841,306

[22] Filed: Mar. 19, 1986

[30] Foreign Application Priority Data

Mar. 21, 1985 [DE] Fed. Rep. of Germany ....... 3510182

[51] Int. Cl.⁴ .............................................. B29C 47/30
[52] U.S. Cl. ..................................................... 425/464
[58] Field of Search ................................. 425/461–467

[56] References Cited

U.S. PATENT DOCUMENTS

| 4,298,328 | 11/1981 | Frost | 425/466 |
| 4,333,896 | 6/1982 | Cunningham | 425/147 |
| 4,384,841 | 5/1983 | Yamamoto | 425/461 |
| 4,472,179 | 9/1984 | Siard | 425/376 A |

FOREIGN PATENT DOCUMENTS

| 918913 | 2/1963 | United Kingdom . |
| 1483013 | 8/1977 | United Kingdom . |
| 2153708 | 8/1985 | United Kingdom . |

Primary Examiner—Bernard Nozick
Attorney, Agent, or Firm—Schwartz, Jeffery, Schwaab, Mack, Blumenthal & Evans

[57] ABSTRACT

In the case of this extrusion device, a die part with feed passageways for the plastic material on the inlet side and shaping slots on the outlet side, which are connected to the feed passageways, is supported on a stationary part. The die passageway for the skin of the honeycomb structure is formed by interaction of an adjustable die element with the die part on the outlet side. For this purpose, a disk spring column as die element is arranged around the die part and is supported on a tensioning element which is adjustable in the flow direction of the material. In the feeds of the die passageway is arranged an adjustable means for regulating the flow rate of the plastic material.

3 Claims, 3 Drawing Figures

EXTRUSION DEVICE FOR THE PRODUCTION OF HONEYCOMB STRUCTURES

BACKGROUND OF THE INVENTION

Subject-matter of the invention is an extrusion device for the production of honeycomb structures from plastic material, consisting of a die part supported on a stationary part and with feed passageways for the plastic material on the inlet side and shaping slots on the outlet side, which are connected to the feed passageways, and a die element, which is adjustable by means of adjustment means and, with the die part, forms on the outlet side the die passageway for the skin of the honeycomb structure. The die passageway is connected via feeds to the inlet side of the die part.

Honecomb structures have a plurality of parallel flow passageways extending in axial direction, which are separated from one another by thin walls. The flow passageways are surrounded by a skin, which closes them off from the outside. For reasons of stability during the production operation, of maintenance of precise diameter tolerances and for the meeting of technical requirements for adequate mechanical strength in assembly and in operation of the honeycomb structures, the skin must be made in a certain wall thickness, which is always greater than the thickness of the partitions between the flow passageways. Furthermore, different flow rates of the material in the skin region and in the honeycomb region are to be avoided.

According to European Patent Specification No. 0,040,052, an extrusion die is known which has on its outlet side a movable recess means, with the aid of which the thickness of the skin can be influenced. What is disadvantageous is that with the recess means, which together with the die forms the die passageway for the skin, only the outlet cross-section for the material stream forming the skin can be adjusted, and not the flow rate of the material itself. Thus, it is not possible to adapt the flow rate of the plastic material in the skin region to that in the honeycomb region.

SUMMARY OF THE INVENTION

This is where the invention is intended to provide a remedy. The present invention is therefore based on the object of finding a technical design solution of an extrusion device in which, independently of the outlet cross-section of the die part forming the skin portion, the rate of the plastic material flowing there can be regulated and thus the flow rate of the material in the honeycomb region and in the skin region can be adapted exactly to each other.

The invention solves the object by an extrusion device of the type stated at the start, wherein, for the formation of the die passageway, a disk spring column or die element is arranged concentrically around the die part and is supported on a tensioning element, which is adjustable in the flow direction of the material, and an adjustable means for regulating the flow rate of the plastic material is arranged in the feeds of the die passageway.

The means may also be arranged in the die part so that they can be pushed into the feeds radially or tangentially to the flow direction of the material.

The advantages achieved by the invention are to be seen substantially in that the flow rate of the plastic material which is necessary for the formation of the skin can be changed, in particular during the extrusion operation, independently of the adjustment of the skin thickness. Thus it is possible to adapt exactly the flow rate of the material in the skin region and honeycomb region independently of the skin thickness and/or the consistency of the material. A satisfactory joining of the skin part with the honeycomb part is thereby achieved.

BRIEF DESCRIPTION OF THE DRAWINGS

The invention is explained in more detail below in an exemplary embodiment with reference to drawings, in which.

DETAILED DESCRIPTION OF PREFERRED EMBODIMENTS

Figure 1:
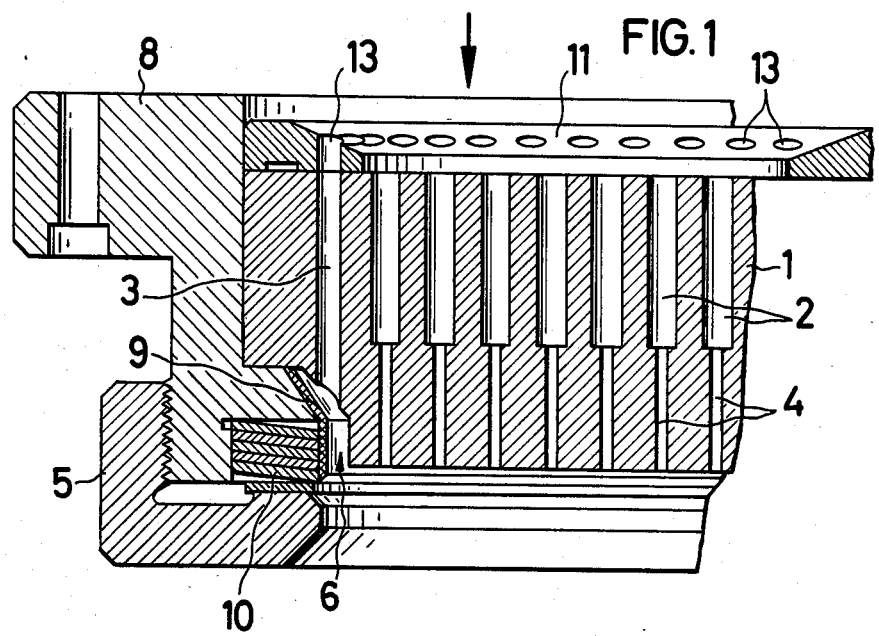
FIG. 1 shows the extrusion device according to the invention in which a breaker plate is arranged on the inlet side of the die part as a means for regulating the flow rate of the material and the die passageway for the skin is formed by the die part and a disk spring column arranged concentrically around it.
Figure 2:
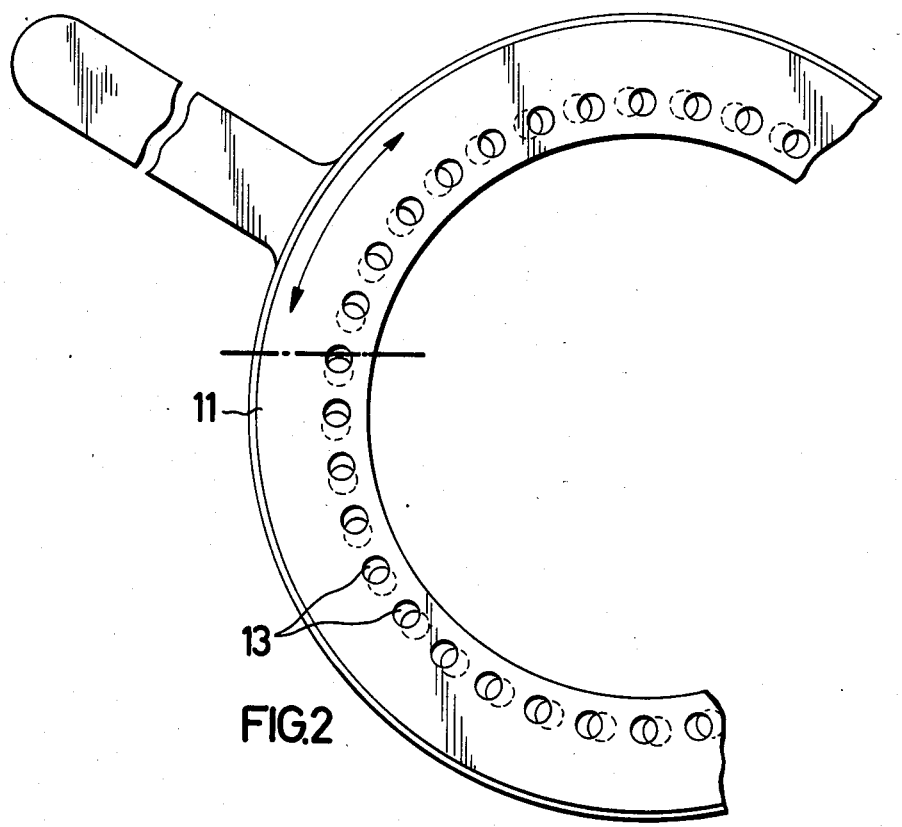
FIG. 2 shows the breaker plate from above.

The plastic material is fed from the inlet side of the die part 1 via the feed passageways 2 to the shaping slots 4 and via the feeds 3 to the die passageway 6. The die passageway 6 is formed by the die part 1 and the adjustable die element 10. The die part 1 is supported on a stationary part 8.

The die element 10 consists of a column of disk springs, which are arranged concentrically around the die part 1 and with it form the die passageway 6 for the skin. By pressing the column against the stationary part 8 of the device, e.g. with a tensioning element 5, the springs deflect radially toward the die part 1; the die passageway 6 becomes narrower. 9 indicates a seal.

According to FIG. 1, a breaker plate 11, the orifices 13 of which are designed congruent to the feeds 3 of the die part 1, is arranged as displaceable means 7 for regulating the flow rate of the material on the inlet side of the die part 1. By turning the breaker plate 11, the cross-section of the feeds 3 may be changed and thus the flow rate of the material influenced. In this way, satisfactory joining of the material in the boundary layer between honeycomb part and skin part during the extrusion operation without alteration of the skin thickness may be ensured because both material streams can be adjusted to the same rate. By a corresponding design of the die element 10 determining the width of the die passageway 6, the thickness of the skin can, of course, likewise be adjusted without interruption of the extrusion operation, if this becomes necessary, e.g. for reasons of maintaining certain tolerances of the diameter of the honeycomb structure.

Figure 3:
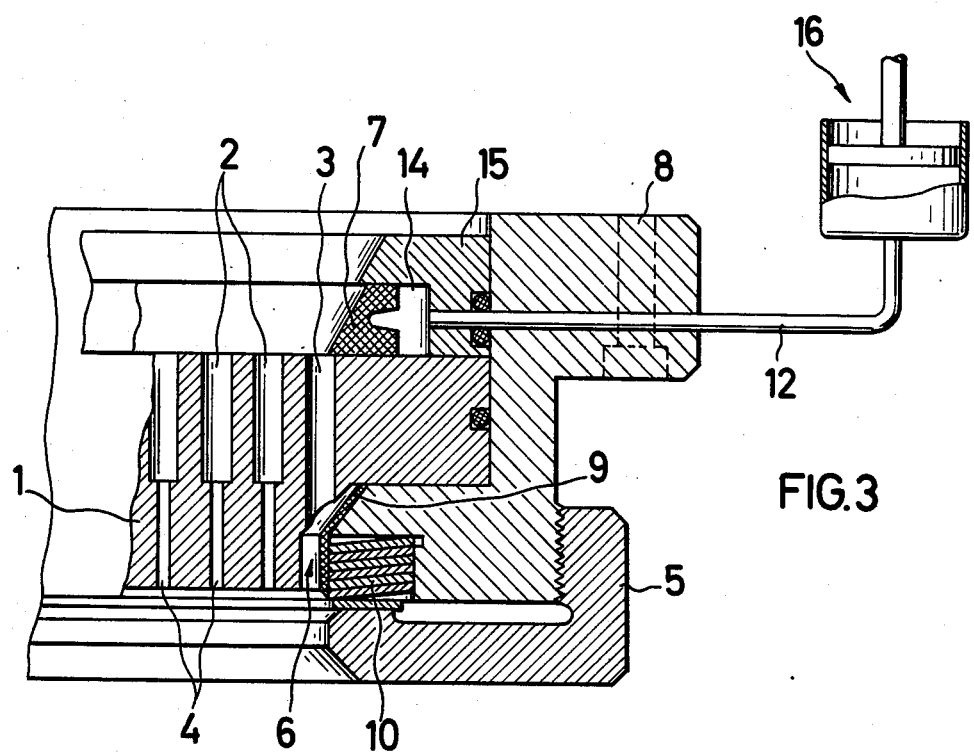
FIG. 3 shows a device in which the means for regulating the flow rate of the material in the die part is arranged so that it can be pushed into the feeds radially to the flow direction of the material.

In the variant in accordance with FIG. 3, the means 7 for regulating the flow rate of the material in the die part 1 are arranged such that they can be pushed into or pulled out of the feeds 3 transverse to the flow direction of the material. Suitable as drive for the means 7 are mechanical or pneumatic means or, as illustrated in FIG. 3, an hydraulic device 16, which is in connection via line 12 with the working space 14 of the means 7. The means 7 are held by the ring 15.

We claim:

1. An extrusion device for the production of honeycomb structures from plastic material, comprising a die part supported on a stationary part, feed passageways for the plastic material on an inlet side and shaping slots on an outlet side, which are connected to the feed passageways, a die element, which is adjustable by means of adjustment means and, with the die part, forms on the outlet side a die passageway for the skin of the honeycomb structures, the die passageway being in connection via feeds outwardly of the feed passageways on the die part to the inlet side, wherein, for the formation of the die passageway, a disk spring column is arranged concentrically around the die part and is supported on a tensioning element, which is adjustble in flow direction of the material to control the flow in the die passageway, and an adjustable means for regulating the flow rate of the plastic material is arranged upstream of the feeds to the die passageway.

2. An extrusion device as claimed in claim 1, wherein a breaker plate, having orifices which are designed congruent to the feeds of the die part, is arranged as the adjustable means on the inlet side of the die part.

3. An extrusion device as claimed in claim 1, wherein the adjustable means are arranged upstream of the die part and can be pushed over the feeds in a direction radial to the flow direction of the material.

* * * * *

UNITED STATES PATENT AND TRADEMARK OFFICE
CERTIFICATE OF CORRECTION

PATENT NO. : 4,668,176
DATED : May 26, 1987
INVENTOR(S) : ZEIBIG et al.

It is certified that error appears in the above-identified patent and that said Letters Patent is hereby corrected as shown below:

ON THE TITLE PAGE, ASSIGNEE SHOULD READ:

Kindly delete "Hoechst Ceramtec Aktiengesellschaft" and insert instead:
-- Hoechst CeramTec Aktiengesellschaft --.

Signed and Sealed this

Tenth Day of May, 1988

Attest:

DONALD J. QUIGG

Attesting Officer

Commissioner of Patents and Trademarks